United States Patent [19]

March

[11] Patent Number: 4,951,910

[45] Date of Patent: Aug. 28, 1990

[54] VERTICALLY ADJUSTABLE VELCRO STRAP DRINK HOLDER

[76] Inventor: William B. March, 301 Hadrian, Mobile, Ala. 36606

[21] Appl. No.: 312,886

[22] Filed: Feb. 17, 1989

[51] Int. Cl.$^5$ .................................................. A47K 1/08
[52] U.S. Cl. ................................. 248/311.2; 248/205.2
[58] Field of Search .................. 248/311.2, 309.1, 314, 248/313, 214, 205.2; 224/226, 251, 253, 901; 297/194, 188; 211/71, 74

[56] References Cited

U.S. PATENT DOCUMENTS

| | | | |
|---|---|---|---|
| D. 226,623 | 4/1973 | Shuford | 248/311.2 |
| 1,288,839 | 12/1918 | Conrad | 248/313 |
| 1,547,014 | 7/1925 | Bantel | 248/313 |
| 2,686,032 | 8/1954 | Thorson | 248/313 X |
| 3,462,109 | 8/1969 | Forbes | 248/311.2 X |
| 3,977,582 | 8/1976 | McMahon | 224/901 X |
| 4,420,104 | 12/1983 | Diienno | 224/253 X |
| 4,557,452 | 12/1985 | Khuong | 248/214 |
| 4,634,089 | 1/1987 | Wright | 248/311.2 |
| 4,678,154 | 7/1987 | McFarland | 248/311.2 |
| 4,721,276 | 1/1988 | Moss | 248/311.2 |

*Primary Examiner*—J. Franklin Foss

[57] ABSTRACT

A drink holder for use in a vehicle using standard retention means such as a U-shaped bracket to hold an inwardly curved L-shaped receiving unit on which is mounted at the top and bottom of the vertical stretch of the L-shaped receiving unit an inwardly curved front sleeve with a curved flange having cooperating arms off either end of the flange, the flange being inserted slidably within the space defined by the vertical stretch of the L-shaped receiving unit and ther front sleeve and where one of the cooperating arms has male velcro backing and the other velcro arm has female velcro backing mounted so that the two cooperate to allow the velcro to interact when one arm overlaps the other.

13 Claims, 2 Drawing Sheets

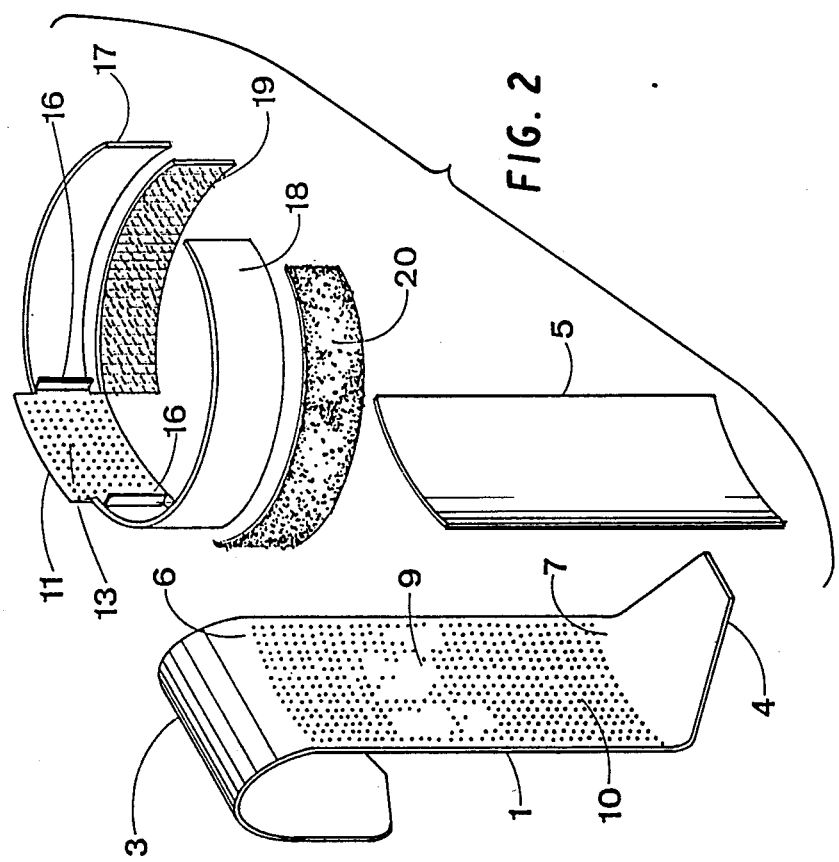
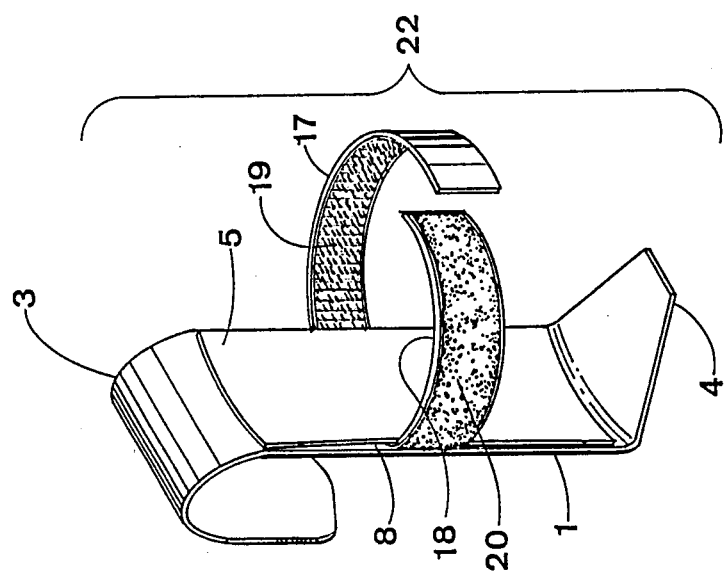

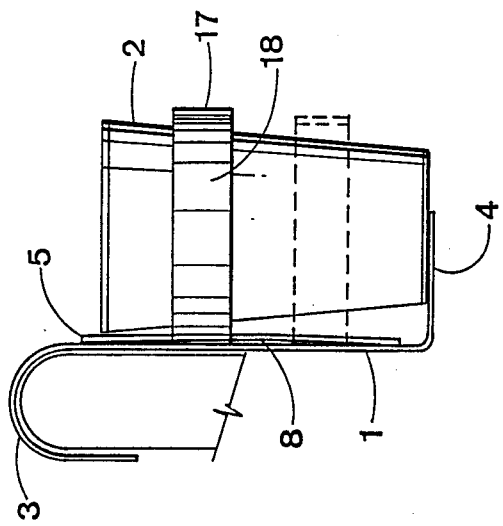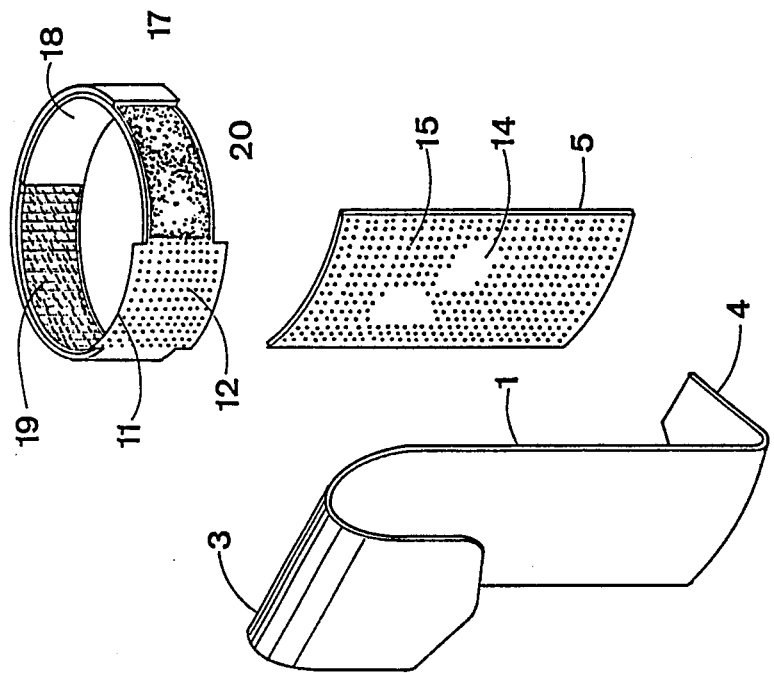

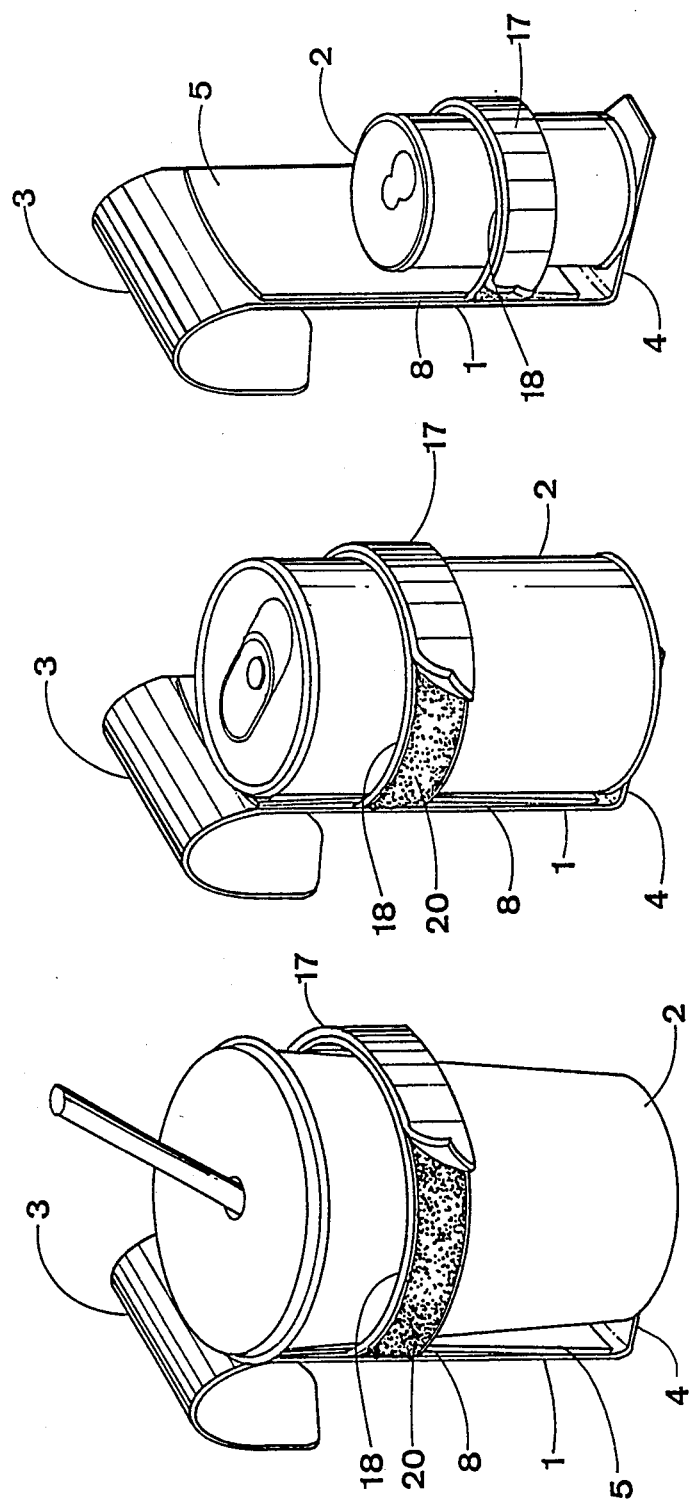

VERTICALLY ADJUSTABLE VELCRO STRAP DRINK HOLDER

DISCUSSION OF THE PRIOR ART

1. Field of Invention

The invention relates to receptacle type supports and brackets. More particularly, the invention relates to drink containers used in vehicles. More particularly, the invention pertains to a drink receptacle having a gripping means for holding a container upright which is adjustable vertically and uses velcro straps to adjust the circumference of the arms holding the drink to firmly hold the drink firmly.

2. Pertinent Prior Art

The patent addresses the question of how containers of various sizes and shapes, usually curved, may be held with stability by a single container.

The most pertinent prior art and the closest prior art includes the patents listed below:

| Patent No. | Inventor |
|---|---|
| 4,096,977 | Barville et al |
| 4,414,692 | Dzierson, et al |
| 3,648,830 | Graf |
| 558,672 | Rivard |
| 898,755 | Little |
| 2,532,244 | Pasmore |
| 4,767,092 | Weatherly |
| 164,692 | Kelly |
| 162,959 | Janes, et al |

Several cup holders have an adjustable grasping means shown in the prior art.

None of these use velcro and each of these suffers from one of two difficulties. First, they do not have a tight adjusting mechanism. Second, they are difficult to adjust compared to one using velcro.

The use of velcro accomplishes several results. The resilient nature of velcro is translated to the strap allowing the strap have some elasticity in its grip of the container held by the invention. The design allows for the invention to be easily adjusted. To adjust the size, no buckles need be used. Two arms are used to hold the velcro. These arms need only be pressed together where the velcro is applied to the arms and the device is properly adjusted.

The closest prior art, U.S. Pat. Nos. 898,755 and 4,767,092, show adjustable partially flexible support arm units. These support arms do not adjust up or down. One is spring loaded and hence might allow a container to slip out, the other is not functional without a buckle.

The buckle requires more careful alignment of the two sides of the buckle in order for the patent to function properly than is necessary with a velcro strap. The buckle is only prevented from slipping by friction or a more complex, harder to adjust buckle. The buckle does not have the same elasticity of the velcro which is translated to the grip on the container.

The use of an adjustable drink holder has certain problems which are not easily addressed. With stiff drink holders, the holder easily receives a drink. With a tightened or adjustable strap, adjustment of the strap may need to take place every time that the cup is removed if a tight grip is desired. Velcro is superior in this regard because it is easily adjusted.

In some cases, the straps are desired to loosely hold the drink so it may be easily inserted and removed. In other cases, the straps are desired to tightly grip the container. Even with the prior designs which are adjustable to the diameter of the containers, the adjustment mechanism is difficult to use, especially with a moving vehicle when other distractions associated with driving are presented.

The prior art, even that using buckles, is also difficult to adjust for different height drink containers. This invention allows for some adjustability in height. For a very small container the prior art may be too high or for a very large container would hold it too low, especially in light of the fact that it would necessarily have to grip the container loosely or would have to be re-buckled after each removal of the container.

Use of velcro to hold containers are shown under very different conditions. U.S. Pat. No. 4,096,977 shows an anchoring mechanism which uses velcro but does not use it on a container nor does it use it with connection with a L shaped member or with an automobile. Nor is velcro used with a buckle which adjusts vertically as is shown here. Velcro straps instead are typically fixed in a given location on an article.

U.S. Pat. No. 4,414,692 shows the use of a velcro for holding a pocket portion. The pocket portion utilizes velcro in order to properly grip a container while the glove has velcro pads that are used to grip the pocket holder.

This particular patent is not immediately applicable to the present invention. Although velcro has been used in order to hold a drinking vessel, and although there is a pocket portion, these are not used in connection with an arm support unit nor does it provide for removal of the receptacle and insertion freeing the hands, in fact, it teaches away from this result. The prior art does not allow for vertical adjustment of the drink holder.

There are numerous inventions which have attempted to address the problem of holding containers in a vehicle, which are not broadly adjustable or else these were difficult to adjust.

The use of velcro as an attaching mechanism, though old in the art, has never been used in this area. Velcro alone accomplishes vertical and horizontal attachment. Here, by interposing vertical adjustability, the velcro, while functioning somewhat in its usual capacity to provide a tight fit along one axis, allows the strap to be adjusted to slide to the best center of gravity or gripping area for a container. Satisfying results are obtained as the velcro straps are biased so the drink holder may be adjusted with a single hand where prior designs require the use of two hands even with velcro.

This additional improvement is to have one of the arms semi-rigid so that it remains in place inside of the other arm which may be more flexible which is biased further outward. In this way, because the one arm is less flexible and remains more or less horizontal along the container, the other arm may be adjusted more easily with one hand to be in proper contact with the first arm and the first, semi-rigid arm, provide some support to the container while the second arm is attached.

In the preferred embodiment, the U-shaped bracket serves to hold the L-shaped receiving unit to car window as is old in the art. Preferably, the U-shaped bracket is of flexible material so as to fit varying width windows. Any manner of mounting which does not allow excessive rocking to occur and which secures the L-shaped receiving unit is satisfactory.

For purposes of description, only the L-shaped receiving unit which receives the front sleeve is separated into the U-shaped bracket 3, the vertical stretch 1 and the perpendicularly mounted bottom supporting member 4, although these parts are made as a single unit. Similarly the front sleeve 5 may be molded together with the remainder of the L-shaped receiving unit, although this is not the preferred manner of construction.

As seen in this light, there are two major improvements in the present invention. The first is in the use of two cooperating arms having velcro backing biased to curve inward for easy use. The second is in forming a sleeve to receive a horizontal strap holding the two cooperating arms.

Although each of these qualities provides significant improvements over designs in the prior art, the combination provides full flexibility with easy adjustability of the product for mounting a myriad of containers.

Therefore, the primary objects of the invention are to provide a receptacle holder for an automobile which may be adjusted for articles of differing heights and diameters.

A further object is to provide such a receptacle holder which may be made to tightly and elastically hold such a container or may be made to loosely hold a container in the manner shown in the prior art for such containers.

A further object of the invention is to provide such a receptacle holder which is easily adjusted to different receptacle diameters.

A further object of the invention is to provide such a receptacle holder which allows for containers to be held at different heights while keeping the gripping arms at same heights relative to one another.

These and other objects of the invention may be more readily observed from the accompanying drawings and detailed description given below.

BRIEF DESCRIPTION OF THE DRAWINGS

In the accompanying drawings the preferred embodiment is illustrated in which the same reference numerals designate the same parts in all views.

FIG. 1 is a perspective view of the invention.

FIG. 2 is an exploded view of the invention shown in the FIG. 1.

FIG. 3 is a reverse view of the vertical body and front sleeve shown in FIG. 2.

FIG. 4 is a side view of the invention of FIG. 1 which shows the movement possible in the adjustable arm.

FIG. 5 shows the invention used to hold a large container such as a large paper wax drinking cup of 44 ounces.

FIG. 6 shows the invention holding a more typical drinking can of 12 ounces.

FIG. 7 shows the container used to hold a very small container such as a 6 ounce drinking can.

DETAILED DESCRIPTION OF THE PREFERRED EMBODIMENT

FIG. 1 shows the assembled drink holder 22 as it would appear when the female velcro 20 and the male velcro 19 are disengaged. As can be seen in this embodiment, the inner strap 18 and the outer strap 17 are naturally curved inward with the inner strap 18 curving farther inward than the outer strap 17 to make closure by contacting the velcro surfaces 19 and 20 easily accomplished with one hand.

The inward curvature or biasing of straps 17 and 18 is for the purpose of allowing easy adjustment with one hand. The inner strap 18 may, however, be sufficiently biased inward to allow the inner strap to hold the drink 2 even before fully secured with the outer strap 17.

Although the device may be made as two units only, in the preferred embodiment it is shown in five basic units as shown in FIG. 2. The first of these units is a main vertical body 21 manufactured as a single unit comprised of the flexible door attachment strap 3, the vertical stretch 1 and the bottom support 4 shown on FIG. 2.

On top of the main vertical body 21 is a flexible door attachment strap 3 which is curved at the point where it connects with the main vertical body 21 and flattens as it moves back. At the lower end of the main vertical body is a bottom support 4 which is rigidly attached perpendicular to the vertical stretch 1 at the bottom of the vertical stretch 1. A front sleeve is attached at the top of the main vertical body 6 below the flexible door attachment strap and is attached at a second point to the main vertical body 21 above the bottom support 7. A groove 8 as shown in FIG. 1 is defined by the area between the main vertical body 1 and the front sleeve 5. In the preferred embodiment the face 9 of the main vertical body 21 facing the front sleeve 5 is equipped with a frictional surface 10.

Horizontal strap 11 or ridged flange 11 having a height of approximately one inch is insertable into the groove 8 defined by the front sleeve 5 and the vertical stretch 1. This horizontal strap 11 has a frictional surface 12 to correspond to and engage the frictional surface 10 on the vertical stretch 1. Additionally, on the face of the horizontal strap 12 opposite the vertical stretch 1 a second frictional surface 13 is provided to contact a back frictional surface 14 which is on the face of the front sleeve 5 facing the horizontal strap 11.

In the preferred embodiment there frictional surfaces 10, 12, 13 and 14, consist of raised cylindrical stubs 15. Although the spacing of stubs 15 may be varied, the stubs 15 are sufficiently close so that the horizontal strap 11 is held more or less in place except when added force is given to the horizontal strap 11 to move it either down or upward. The horizontal strap 11 is equipped on either side where it extends past the back vertical strip with a ridge 16 which prevents the strap 11 from sliding out from the sleeve 8 and keeps it from twisting.

Although a frictional surface 12 on the horizontal strap, 11 on the vertical stretch 1 and 15 on the back sleeve 5, any means for fixing the height of the horizontal strap 11 would be equally acceptable to accomplish the results sought using the frictional surface used in the preferred embodiment. Many materials are sufficiently frictional in and of themselves to serve this purpose.

On one side of the horizontal strap 11 an outside strap 17 is attached at one end. On the opposite side of the horizontal strap 11 an inside strap 18 is attached.

Each one of these straps, 17 and 18, is approximately seven inches long. The width of the horizontal strap itself is approximately two inches long. The straps 17 and 18 are, therefore, sufficiently long to allow the product to encircle a container 2 which has a circumference of more or less than sixteen (16) inches.

A male velcro strip 19 is attached to the outside strap 17 along the inner face of the outside strap 17. In this case the male velcro strip 19 refers to the portion having hooks. A female velcro strip 20 is attached to the inside strap 18 along the outer face of the inside strap 18 referring to the portion of the velcro strip which has loops. In this way, with the inside strap 18 in place along circumference of the container 2 to be held the outside strap 17 may be held over the inside strap 18 and the velcro on strap 17 and 18 brought in contact, securely adjusting and gripping the container 2 to be held. As is obvious from the above referenced description, the male 19 and female velcro 20, may be switched without making a substantial difference in the function of the device. The selection of which is the outside and which is the inside strap is purely arbitrary.

The preferred embodiment has raised cylindrical stubs 15 in order to maintain the horizontal strap 11 in place within the grove 8 the device would function equally well when properly adjusted without any special frictional surface except that the strap 11 would not necessarily remain in place along the vertical stretch 1. The horizontal strap 11 is designed, however, to move along the vertical stretch 1 in order to grip containers that are very low or containers that are very high and hence adjustability and frictional dampening is desirable.

Although in the preferred embodiment the door attachment strap 3 is flexible, the door attachment strap 3 need not be flexible and may be rigid so that this entire unit may be rigidly constructed.

The frictional backing need not be added to the front sleeve 5 and the vertical stretch 1 or may only be added to either one in the event the material used for construction has a sufficiently high frictional co-efficient. An example of this type of material would be to make both the main vertical body 21 back sleeve 8 and the horizontal strap 11 of rubber.

Also, this result of maintaining the vertical location of the horizontal strap 11 may be maintained by having the vertical stretch 1 and back sleeve 5 closer together than the thickness of the horizontal strap 11. If the vertical stretch 1 and back sleeve 5 are sufficiently flexible the horizontal strap 11 may fit between the vertical stretch 1 and the back sleeve 5 by strecthing the stretch 1 or the sleeve 5 and is held in place vertically by the elastic tension.

Similarly the front sleeve 5 and the horizontal strap 11 could be made of material with a sufficient frictional coefficient which would leave the construction of the main vertical body 21 open.

FIGS. 4-7 show that with the variety of containers which may be mounted in the container holder, both the height at which the container is held and the adjustability which the velcro straps allow are important.

Reference to FIGS. 5, 6 and 7 shows the vertical stretch 1 is curved in order to receive a container 2.

FIG. 4 shows an outline of how the container may be easily gripped as the straps move lower. With more flexible arms, or even with a single flexible arm, the flexible arm or arms will actually bend to the shape of the cup as the cup moves like a cone downward.

What I claim is:

1. A drink holder for use in a vehicle having comprising;
    (a) A main vertical body having a means for attachment to the vehicle, a vertical stretch mounted on the means for attachment, and a bottom support rigidly attached at the lower end of the vertical stretch;
    (b) A front sleeve connected at the top and bottom of the vertical stretch so that the middle of the back sleeve and the area of the vertical stretch facing the front sleeve define a groove;
    (c) A horizontal strap inserted in the groove defined by the front sleeve and the vertical stretch;
    (d) A semi-rigid outside strap attached to one end of the horizontal strap and extending out of the groove;
    (e) A semi-rigid inside strap attached perpendicularly to the end of the horizontal strap opposite the outside strap extending out of the groove;
    (f) One of two male-female velcro strips attached to the outside strap along the inner face of the outside strap;
    (g) The corresponding opposite sexed female velcro strip of that attached to the outside strip attached to the inside strap along the outer face of the inside strap.

2. The drink holder of claim 1 wherein the front sleeve and the vertical stretch have a means for frictional contact for maintaining the position of the horizontal strap in the groove.

3. The drink holder of claim 2 wherein the means for frictional contact comprises:
    (a) an irregular surface along the side of the vertical stretch facing the front sleeve, an irregular surface on the side of the front sleeve facing the vertical stretch and an irregular surface on either side of the horizontal strap.

4. The drink holder of claim 1 wherein the vertical stretch and the front sleeve curve inward so as to provide an indented surface for receiving the drink.

5. The invention of claim 4 wherein the vertical strip and the horizontal strap are provided with the same amount of curvature so that the horizontal strap may freely slide within the groove formed by the front sleeve and the vertical stretch.

6. The invention of claim 1 wherein the horizontal strap and the inner arm and the outer arm made of a single unit.

7. The invention of claim 6 where the arms are fixedly mounted on the main vertical body.

8. The drink holder of claim 1 wherein the inner strap is made to curve inward when no pressure is exerted on the inner strap and the outer strap is made to curve inward less than the inner strap when no pressure is exerted on the inner strap so as to keep the inner strap and outer strap out of contact a sufficient distance to prevent the male and female velcro strips from coming into contact when the inner strap and outer strap are at rest.

9. The drink holder of claim 8 wherein the inner strap is biased in its curve inward so as to exert pressure on the drink held in the drink holder.

10. The drink holder of claim 1 wherein the vertical stretch and back sleeve are closer together than the thickness of the horizontal strap and are sufficiently flexible so that the horizontal strap may fit between the vertical stretch and the back sleeve.

11. The drink holder of claim 1 wherein the vertical stretch is rigid.

12. A drink holder for use in a vehicle having comprising;
    (a) A main vertical body having a means for attachment to the vehicle, a vertical stretch mounted on the means for attachment, and a bottom support rigidly attached at the lower end of the vertical stretch;

(b) A front sleeve connected at the top and bottom of the vertical stretch so that the middle of the back sleeve and the area of the vertical stretch facing the front sleeve define a groove;
(c) A horizontal strap inserted in the groove defined by the front sleeve and the vertical stretch;
(d) An outside strap attached to one end of the horizontal strap and extending out of the groove;
(e) An inside strap attached perpendicularly to the end of the horizontal strap opposite the outside strap extending out of the groove;
(f) One of two male-female velcro strips attached to the outside strap along the inner face of the outside strap;
(g) The corresponding opposite sexed female velcro strip of that attached to the outside strip attached to the inside strap along the outer face of the inside strap.

13. The invention of claim 12 wherein the inside and outside strap are each between five and seven inches in length.

* * * * *